(12) United States Patent
Giacomino

(10) Patent No.: US 12,454,322 B2
(45) Date of Patent: Oct. 28, 2025

(54) RUBBER TRACK FOR A TRACKED VEHICLE, AND TRACKED VEHICLE COMPRISING SAID RUBBER TRACK

(71) Applicant: GRUPPO MINITOP S.R.L., Bricherasio (IT)

(72) Inventor: Giovanni Pietro Giacomino, Bricherasio (IT)

(73) Assignee: Gruppo Minitop S.R.L., Bricherasio (IT)

(*) Notice: Subject to any disclaimer, the term of this patent is extended or adjusted under 35 U.S.C. 154(b) by 482 days.

(21) Appl. No.: 17/920,204

(22) PCT Filed: Apr. 23, 2021

(86) PCT No.: PCT/IB2021/053372
§ 371 (c)(1),
(2) Date: Oct. 20, 2022

(87) PCT Pub. No.: WO2021/220119
PCT Pub. Date: Nov. 4, 2021

(65) Prior Publication Data
US 2023/0159119 A1    May 25, 2023

(30) Foreign Application Priority Data
Apr. 28, 2020    (IT) .................. 102020000009226

(51) Int. Cl.
*B62D 55/28*    (2006.01)
*B62D 55/24*    (2006.01)

(52) U.S. Cl.
CPC ............. *B62D 55/28* (2013.01); *B62D 55/24* (2013.01)

(58) Field of Classification Search
CPC ....... B62D 55/24; B62D 55/244; B62D 55/28
See application file for complete search history.

(56) References Cited

U.S. PATENT DOCUMENTS 1,507,458 A * 9/1924 Dreyer .................. B62D 55/24
    305/40
2,022,567 A * 11/1935 Kegresse ............... B62D 55/24
    305/180

(Continued)

FOREIGN PATENT DOCUMENTS

| EP | 1 238 898 A1 | 9/2002 |
| EP | 1 398 252 A1 | 3/2004 |
| JP | H09-076956 | 3/1997 |

OTHER PUBLICATIONS

International Preliminary Report on Patentability dated Oct. 27, 2022, issued in PCT Application No. PCT/IB2021/053372, filed Apr. 23, 2021.

(Continued)

*Primary Examiner* — Kip T Kotter
(74) *Attorney, Agent, or Firm* — Workman Nydegger

(57) ABSTRACT

A rubber track for a tracked vehicle includes a plurality of inner shoes and a plurality of outer shoes, wherein each inner shoe lies opposite to a respective outer shoe, wherein the inner shoe has a substantially arched shape and is provided with a first intermediate portion and first ends, and wherein the outer shoe is provided with a second intermediate portion and second ends, the first ends and second ends being substantially parallel to each other and forming a first contact surface; a support element made of rubber and shaped as an endless ring retained between the inner shoes and the outer shoes, wherein the inner shoes are arranged mutually spaced apart along an inner surface of the support element and the outer shoes are arranged mutually spaced apart along an outer surface of the support element, and wherein the first intermediate portion of each inner shoe is at least partly buried in the support element; a plurality of connection elements for creating the junction between each inner shoe and the respective outer shoe.

18 Claims, 4 Drawing Sheets

(56) References Cited

U.S. PATENT DOCUMENTS

| | | | |
|---|---|---|---|
| 2,378,427 A | | 6/1945 | Myers |
| 3,390,924 A | * | 7/1968 | Bumbaugh ............ B62D 55/24 |
| | | | 305/181 |
| 3,700,288 A | * | 10/1972 | Davin ................... E01C 19/405 |
| | | | 305/167 |
| 4,278,301 A | * | 7/1981 | Gregor ................... B62D 55/26 |
| | | | 305/111 |
| 2004/0150263 A1 | * | 8/2004 | Katoh .................. B62D 55/253 |
| | | | 305/171 |
| 2011/0316330 A1 | | 12/2011 | Doyle |

OTHER PUBLICATIONS

International Search Report and Written Opinion dated Jul. 22, 2021, issued in PCT Application No. PCT/IB2021/053372, filed Apr. 23, 2021.

\* cited by examiner

RUBBER TRACK FOR A TRACKED VEHICLE, AND TRACKED VEHICLE COMPRISING SAID RUBBER TRACK

BACKGROUND OF THE INVENTION

1. The Field of the Invention

The present invention relates to a rubber track for a tracked vehicle according to the preamble of claim 1; furthermore, the present invention relates to a tracked vehicle comprising said rubber track.

2. The Relevant Technology

As is known, the category of tracked vehicles includes many vehicles differing from one another in both shape and function, ranging from military vehicles, conceived for particular requirements of mobility on rough terrain (tanks, self-moving artillery pieces, vehicles for troop transportation) to civil vehicles for work activities or special applications. The adoption of tracks in the place of wheels, in fact, permits the tracked vehicle to distribute its own weight over a larger surface, thus limiting the sinking in the ground, and allows it to overcome steep slopes and run on very rough terrain. Therefore, tracked vehicles are especially suited for use on soft, muddy, sandy, snowy, etc. terrain.

In this frame, the tracked vehicles known in the art comprise a pair of tracks, wherein each track consists of a closed-loop structure and is laterally associated with the vehicle with reference to the direction of forward motion of the vehicle.

Each track is generally driven by a drive wheel and tensioned by at least one idler wheel, which is usually longitudinally slidable for adjusting the track tension.

Each track can be kept in adherence to the ground by means of one or more intermediate idle support wheels, which make it possible to distribute the weight of the tractor evenly on the ground, while optional support rollers guide and support the upper part of the track.

The assembly made up of the drive wheel, the idler wheel, the support wheels and the support rollers is the so-called "track carriage".

The operation of tracked vehicles can be summarized as follows: the drive wheel receives, via the transmission, the motive force of the engine with the necessary torque and the desired speed; in its turn, it rotates the track with which it is engaged, thereby also dragging the idler wheel, which keeps the track under tension. Since tracked vehicles cannot be steered like wheel-equipped vehicles, the steering of tracked vehicles is effected by causing the two tracks to move forward or backward at different speeds; this is obtained by operating manipulators (joysticks), through which the drive engines are made to receive a variable oil flow from the hydraulic distributor.

In particular, closed-loop tracks are known in the art which are essentially composed of mutually hinged metallic elements; however, such metallic tracks suffer from the drawback that they are rather slow and noisy when the tracked vehicle is moving, in addition to causing considerable damage to the roads and surfaces whereon the vehicle runs.

Metallic closed-loop tracks are also known in the art which are provided with rubber layers covering, and usually fixed (e.g., bolted) to, the metallic tracks; however, this solution has several drawbacks as well, such as higher costs and more labour necessary for repairs, in that tracks thus designed are often subject to detachment and/or breakage of the rubber layers, which therefore need frequent replacement.

In order to overcome the above-mentioned drawbacks of metallic closed-loop tracks, rubber tracks have been developed over the years, which have had great success because they are much faster and considerably less noisy than metallic ones; moreover, rubber tracks do not damage the roads and surfaces whereon the vehicle runs, and can therefore be driven also on normal roads.

However, direct contact between the rubber and the ground inevitably results in track damage, so that the life cycle of a rubber track is clearly shorter than that of a metallic track.

In this frame, European patent No. EP1238898B1 relates to a tracked vehicle comprising a pair of endless closed-loop tracks made of rubber, wherein each track is adapted to be mounted on first and second toothed wheels and to be made to rotate between said wheels by driving at least one of said toothed wheels.

In particular, the track shown in European patent No. EP1238898B1 comprises:
  a plurality of inner shoes and a plurality of outer shoes made of metallic material, wherein each inner shoe lies opposite to a respective outer shoe;
  an endless ring-shaped support element retained between said inner shoes and said outer shoes, said rubber element incorporating an endless ring-shaped element made of metal, so that it extends along a longitudinal direction of the rubber element.

According to the teachings contained in European patent No. EP1238898B1, said inner shoes are arranged side by side along the inner surface of the support element, and said outer shoes are arranged side by side along the outer surface of the support element, wherein:
  each inner shoe is at least partly buried in the rubber track, so that a portion coupled to the toothed wheel and a portion connected to the outer shoe are left exposed;
  screws or bolts are used for connecting each inner shoe to each respective outer shoe, wherein said screws or bolts extend within threaded apertures or holes formed in each inner shoe and each outer shoe, said threaded apertures or holes being so oriented as to allow each inner shoe to be connected to the respective outer shoe.

However, even the rubber track described in document EP1238898B1 has some drawbacks, which are mostly due to the fact that in such a rubber track the coupling between each inner shoe and the respective outer shoe is achieved only by means of said screws or bolts, such elements being thus subject to mechanical forces that are exclusively transmitted thereto while the track is moving; it is therefore clear that such mechanical stresses jeopardize the life and the tightening action of the screws or bolts that connect each inner insert to the respective outer insert.

Also with this solution, therefore, the tracks require much labour for the necessary repairs, in that tracks thus designed are often subject to deformation and breakage of the inner and outer shoes (or inserts), requiring replacement thereof (or of the entire track).

Another drawback of the solution shown in document EP1238898B1 is due to the fact that the inner and outer shoes are arranged side by side along the inner periphery and the outer periphery, respectively, of the rubber element; as a consequence, such provisions may cause significant interference between the side-by-side inserts or shoes as the track winds around the drive wheel.

SUMMARY OF THE INVENTION

In this frame, it is the main object of the present invention to provide a rubber track for a tracked vehicle, and an associated tracked vehicle, so realized as to overcome the drawbacks of the prior art.

In particular, it is one object of the present invention to provide a rubber track, and an associated tracked vehicle, so realized as to properly distribute the mechanical forces generated during the motion of the track.

Consequently, it is one object of the present invention to provide a rubber track, and an associated tracked vehicle, which are so realized as to increase the life and integrity of the inner and outer shoes associated with the rubber track, and also of the rubber track itself, thus considerably extending the time intervals to be observed for maintaining or replacing such components.

It is a further object of the present invention to provide a rubber track, and an associated tracked vehicle, which are so realized as to be able to operate properly on different surfaces, particularly also on very rough terrain (e.g., soft, muddy, sandy, snowy, etc. terrain) and/or steep slopes.

It is another object of the present invention to provide a rubber track, and an associated tracked vehicle, which are so conceived as to avoid any undesired interference of the inner and outer inserts as the track winds around the drive wheel and the idler wheel.

It is yet another object of the present invention to provide a rubber track, and an associated tracked vehicle, which are so realized as to avoid any irregularity in the forward motion of the vehicle, particularly by avoiding the generation of constant-frequency vibrations that might adversely affect the whole superstructure of the vehicle, resulting in annoying noise and poor driving comfort.

BRIEF DESCRIPTION OF THE DRAWINGS

Further objects, features and advantages of the present invention will become apparent from the following detailed description and from the annexed drawings, which are supplied by way of non-limiting explanatory example, wherein.

DETAILED DESCRIPTION OF THE PREFERRED EMBODIMENTS

Figure 1A:
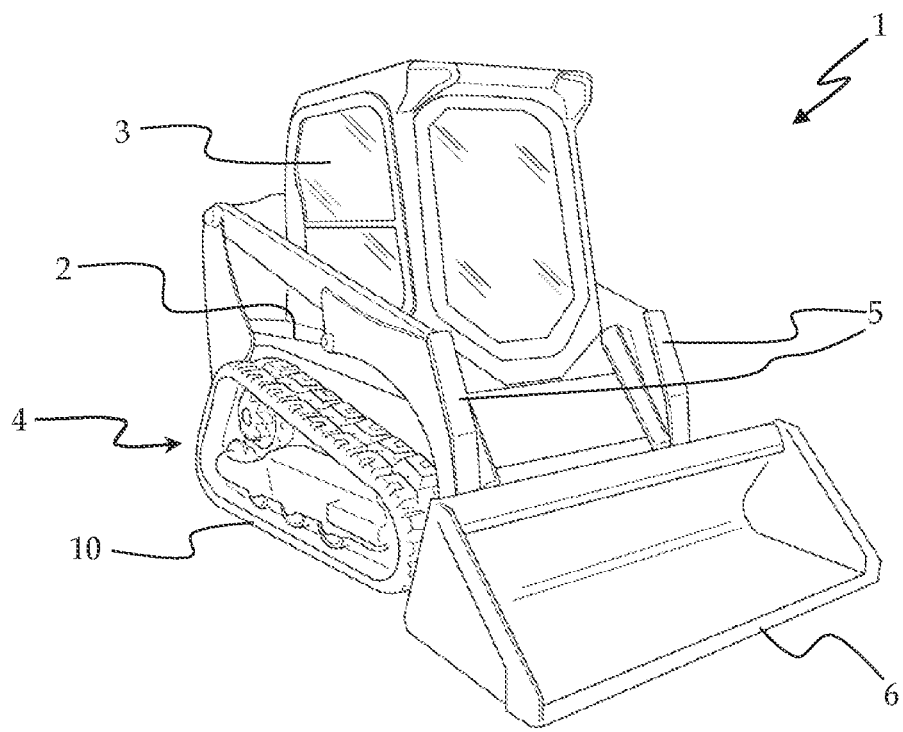
FIG. 1A and FIG. 1B are perspective views of, respectively, a tracked vehicle and a rubber track according to the present invention.

Referring now to the annexed drawings, in FIG. 1A reference numeral 1 designates as a whole a tracked vehicle according to the present invention.

The vehicle 1 is provided with a body 2 comprising a drive cabin 3, an engine (not shown in FIG. 1A, since it is preferably inserted in a suitable housing formed in the body 2), and a pair of track carriages 4 arranged on the right side and the left side of the body 2.

In the embodiment shown in FIG. 1A, the vehicle is a tracked skid loader, which comprises at least one arm 5 associated with the body 2 in such a way that it can move vertically up and down, wherein said at least one arm 5 is equipped, at its end, with a bucket 6, which in turn is constrained to the arm 5 in such a way that it can rotate up and down. Such tracked skid loader may then be equipped with an attachment coupler (not shown), in particular of the hydraulic type and, preferably, associated with said at least one arm 5, which permits the connection and operation of external attachments.

Each track carriage 4 is provided with a rubber track 10 according to the present invention, wherein said track 10 is driven by at least one drive wheel (not shown in detail in FIG. 1A); in addition, the track 10 is preferably kept under tension by at least one idler wheel (also not shown in detail in FIG. 1A).

It should be noted that the vehicle 1 according to the present invention may also consist of a vehicle other than the above-described tracked skid loader; merely by way of example, the vehicle 1 according to the present invention may be a mini excavator, in particular of the 1 to 15 ton type.

It should also be noted that, for the purposes of the present invention, the term "rubber" is used to indicate any material characterized by high elasticity and deformability, wherein such material may be of natural origin (like materials obtained by coagulation of the latex of some plants, such as natural rubber or caoutchouc) or artificial origin (like those obtained by hot or cold polymerization of olefinic hydrocarbons and derivatives thereof in the presence of catalysts, as is the case, for example, of synthetic rubber); it is therefore evident that the term "rubber" should not be understood in a limiting sense.

Figure 1B:
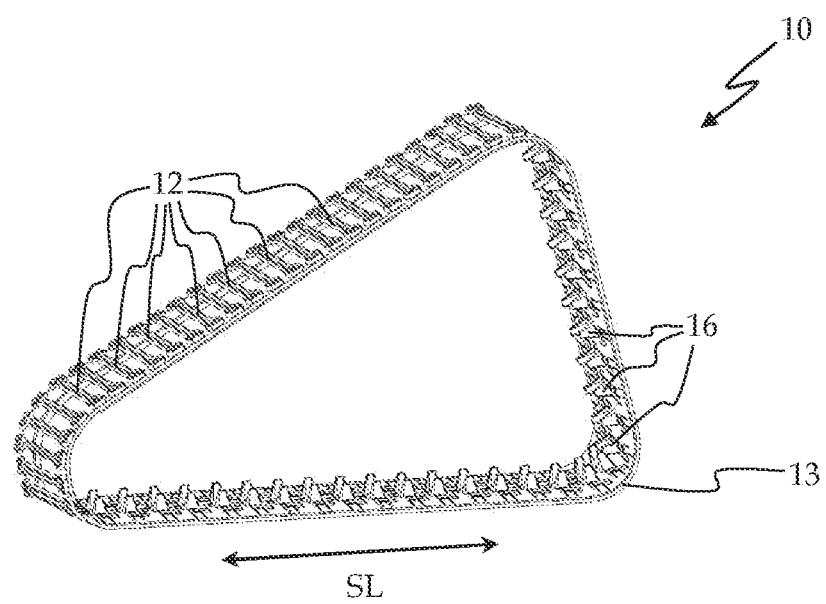

FIG. 1B shows a perspective view of a rubber track 10 according to the present invention.

In particular, in such FIG. 1B one can see that the track 10 is of the endless, closed-loop type, and is suitable for installation on first and second wheels of the vehicle 1 to be rotatably driven between said wheels by the motion of at least one of said wheels, in particular a toothed drive wheel.

Moreover, when observing FIGS. 1B to 2B it can be noticed that the track 10 comprises a plurality of inner shoes 11 and a plurality of outer shoes 12, wherein each inner shoe 11 lies opposite to a respective outer shoe 12.

The inner shoe 11 has a substantially arched shape and is provided with a first intermediate portion 11I and first ends 11E, while the outer shoe 12 is provided with a second intermediate portion 12I and second ends 12E, said first ends 11E and second ends 12E being substantially parallel to each other and forming a first contact surface between the inner shoe 11 and the outer shoe 12.

In addition, the track 10 comprises a support element 13 made of rubber and shaped as an endless ring retained between said inner shoes 11 and said outer shoes 12.

It must be pointed out that said first contact surface formed by the first ends 11E and second ends 12E may also be realized by interposition of a rubber portion, in particular a rubber portion belonging to the support element 13.

Figure 2A:
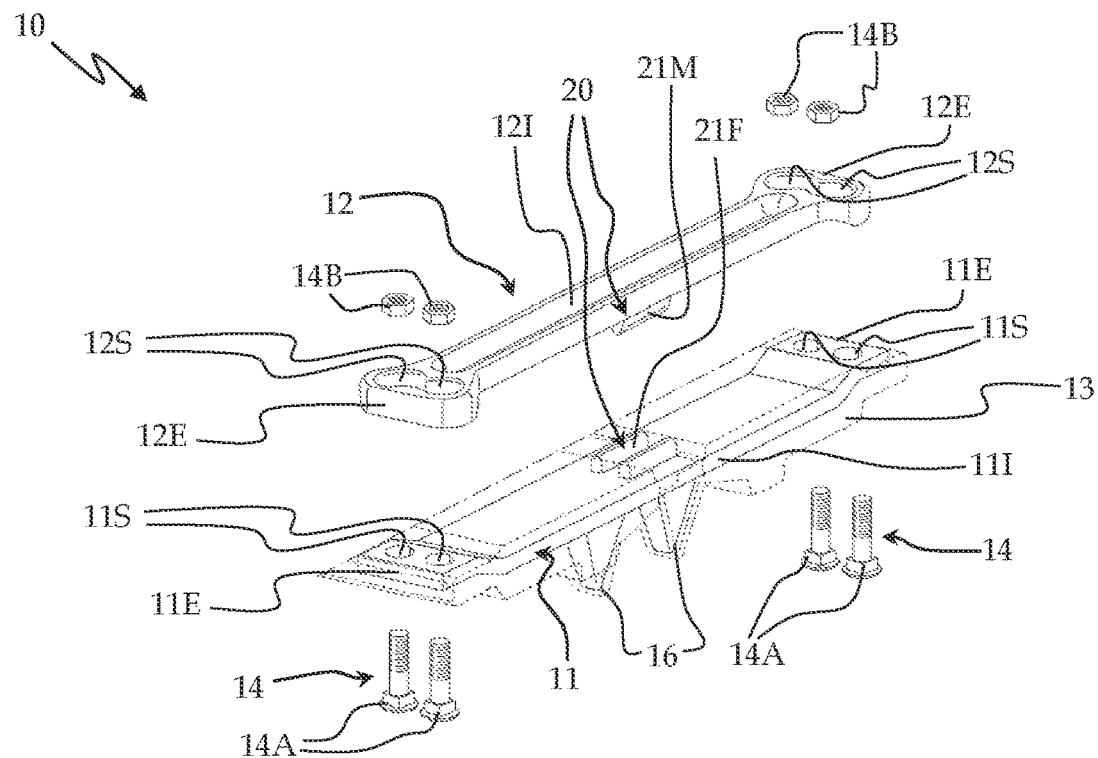
FIG. 2A and FIG. 2B are, respectively, an exploded perspective view and a side sectional view of a portion of the rubber track according to the present invention.

The inner shoes 11 are arranged mutually spaced apart along the inner surface of the support element 13 and the outer shoes 12 are arranged spaced apart along the outer surface of the support element 13, wherein the first intermediate portion 11I of each inner shoe 11 is at least partly buried in the support element 13 (as is especially visible in FIG. 2A, in which the support element 13 has been drawn with dashed lines in order to highlight the inner shoe 11).

In substance, the inner shoes 11 and the outer shoes 12 are arranged transversally relative to a longitudinal development (designated by the double arrow SL in FIG. 1B) of said support element 13 and of the track 10 itself.

The fact that the inner shoes 11 are mutually spaced apart along the inner surface of the support element 13 and the outer shoes 12 are mutually spaced apart along the outer surface of the support element 13 makes it possible to prevent any undesired interference between such components as the track 10 winds around the wheels of the vehicle 1.

Preferably, said support element 13 comprises, buried therein, at least one metallic element shaped as an endless ring (not shown in the drawings), which extends along the longitudinal development SL of the track 10, in particular said element being made from steel strands wound into multiple seamless coils. Such a solution ensures higher tear resistance and prevents the track 10 from elongating; this avoids the need for an operator to make continual adjustments of the tension of the metallic element buried in the track, as is the case with prior-art tracks.

The track 10 according to the present invention comprises a plurality of connection elements 14 for creating the junction between each inner shoe 11 and the respective outer shoe 12, wherein said connection elements 14 are held inside first seats 11S formed in the first ends 11E of each inner shoe 11 and inside second seats 12S formed in the second ends 12E of each outer shoe 12.

In particular, a pair of connection elements 14 are used for each one of the ends 11E, 12E of said inner shoes 11 and outer shoes 12; in fact, FIG. 2A shows that two connection elements 14 are used for one of the ends 11E, 12E of the inner shoes 11 and outer shoes 12, and two other connection elements 14 are used for the other end 11E, 12E of said inner shoes 11 and outer shoes 12.

It is however clear that a different number of connection elements 14 may be used than shown in FIG. 2A.

In accordance with a preferred embodiment, said connection elements 14 consist of square underhead bolts; said bolts are preferably inserted from the inner surface of the track 10 towards the outer surface of said track 10, in particular a head 14A of said bolts being retained in a first seat 11S of the inner shoe 11, which is shaped to receive said head 14A without allowing it to turn.

This embodiment makes it possible to work from the outer surface of the track 10 only, in particular by using a screwer on a nut 14B of the bolt, thus not requiring the track 10 to be removed from the vehicle 1 for periodically checking the tightening torque of the connection elements 14 or for replacing one or more outer shoes 12.

In accordance with the present invention, the first intermediate portion 11I of the inner shoe 11 and the second intermediate portion 12I of the outer shoe 12 comprise mutual coupling elements 20 (designated as a whole by reference numeral 20 in FIGS. 2A and 2B) forming a second contact surface between said inner shoe 11 and outer shoe 12.

In this respect, it is evident that said coupling elements 20 are formed on the mutually facing surfaces of the first intermediate portion 11I and second intermediate portion 12I.

In a preferred embodiment, said coupling elements 20 comprise a male element 21M adapted to be received inside a female element 21F so as to create a coupling system, in particular a joint, of the male/female type.

Figure 2B:
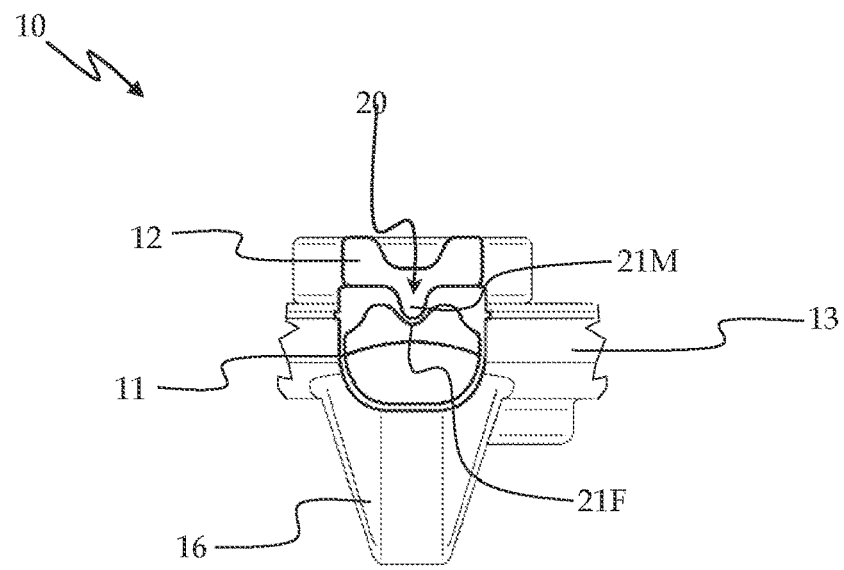

In the preferred embodiment shown in FIGS. 2A and 2B, the male element 21M is formed on the second intermediate portion 12I of the outer shoe 12 and the female element 21F is formed on the first intermediate portion 11I of the inner shoe 11; it is however clear that such elements may be inverted, i.e., the male element 21M may be formed on the first intermediate portion 11I of the inner shoe 11 and the female element 21F may be formed on the second intermediate portion 12I of the outer shoe 12.

Such provisions permit making the inner shoe 11 and the outer shoe 12 more resistant to the drive torque generated by the transmission of the vehicle 1 as it accelerates.

Consequently, the provisions of the present invention make it possible to provide a track 10, and an associated tracked vehicle 1, which are so realized as to correctly distribute the mechanical forces generated when the track 10 is moving; it is therefore clear that such provisions ensure a longer life and a higher integrity of the inner shoes 11 and outer shoes 12 associated with the track 10, as well as of the rubber track 10 itself, thus considerably extending the time intervals to be observed for servicing such components.

In accordance with a preferred embodiment, the inner shoe 11 is made of metallic material.

In such preferred embodiment, the outer shoe 12 is also made of metallic material; however, said outer shoe 12 may be made of different materials.

Figure 3A:
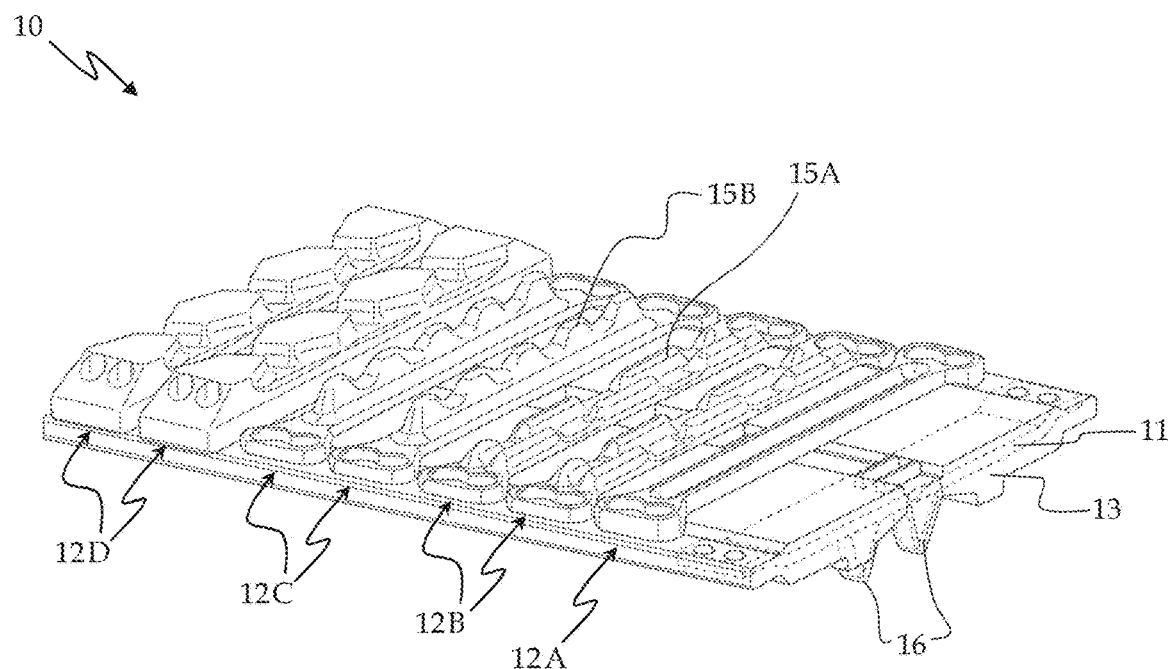
FIG. 3A and FIG. 3B are, respectively, a perspective view of a portion of the outer surface of the track and a side sectional view of the track portion shown in FIG. 3A.
Figure 3B:
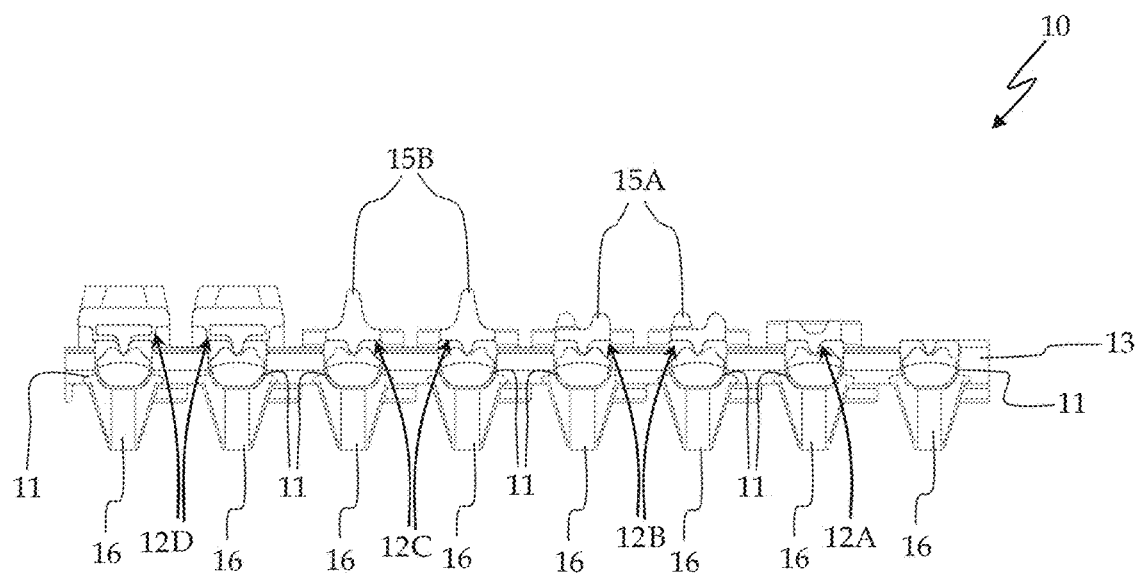

In FIGS. 3A and 3B one can notice that the outer shoe 12 may be so realized as to comprise projections 15 rising from the outer shoe 12 in the direction opposite to the respective inner shoe 11.

In particular, the projections 15 may be so realized as to have different shapes and/or heights relative to the support element 13, depending on the field of application where the vehicle 1 of the present invention will have to be used.

In fact, in FIGS. 3A and 3B one can notice that the outer shoe 12 may be so realized as to have no projections (as is the case in the embodiment designated by 12A, or to have projections 15A having a first shape and a first height relative to the support element 13 (as is the case in the embodiment designated by 12B), or to have projections 15B having a second shape and a second height relative to the support element 13 (as is the case in the embodiment designated by 12C).

Alternatively, the outer shoe 12 may be so realized as to have a core made of metallic material at least partly coated with rubber (as in the case in the embodiment designated by 12D), or said outer shoe 12 may be substantially totally made of rubber.

It must be pointed out that the outer shoes 12 to be sequentially associated with the support element 13 should preferably be all realized as shown in any one of the embodiments designated by 12A, 12B, 12C and 12D in FIGS. 3A and 3B, and that it will seldom be feasible to simultaneously use different outer shoes 12 from different embodiments.

It is evident that the above-described possible embodiments of the outer shoe 12 permit obtaining a track 10, and an associated vehicle 1, which is of a modular type, in that it is suitable for adequately operating on different surfaces, and especially on very rough terrain (e.g. soft, muddy, sandy, snowy, etc. terrain) and/or steep slopes; in this regard, in fact, it should be noted that it will be sufficient to provide the track 10 with an outer shoe 12 specifically designed for a particular application (asphalt, building yard, forestry, snow removal, and so forth) and/or for a particular terrain and/or for a given slope where the vehicle 1 of the present invention will have to be used.

The inner surface of the track 10 comprises a plurality of teeth 16 coupled two by two transversally to the longitudinal development SL of the track 10, so as to form pairs of teeth 16 spaced apart along the longitudinal development SL of the track 10, which define a substantially U-shaped seat; in this embodiment, the pairs of teeth 16 act as a guide for the wheels of the vehicle 1.

Figure 4A:
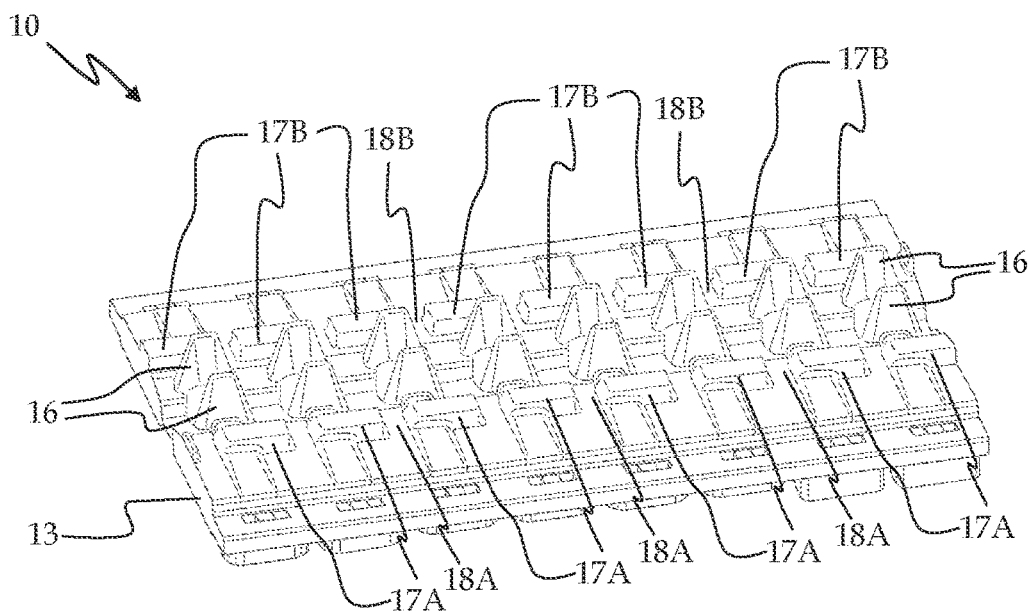
FIG. 4A and FIG. 4B are, respectively, a perspective view of a portion of the inner surface of the track and a plan view of the track portion shown in FIG. 4A.
Figure 4B:
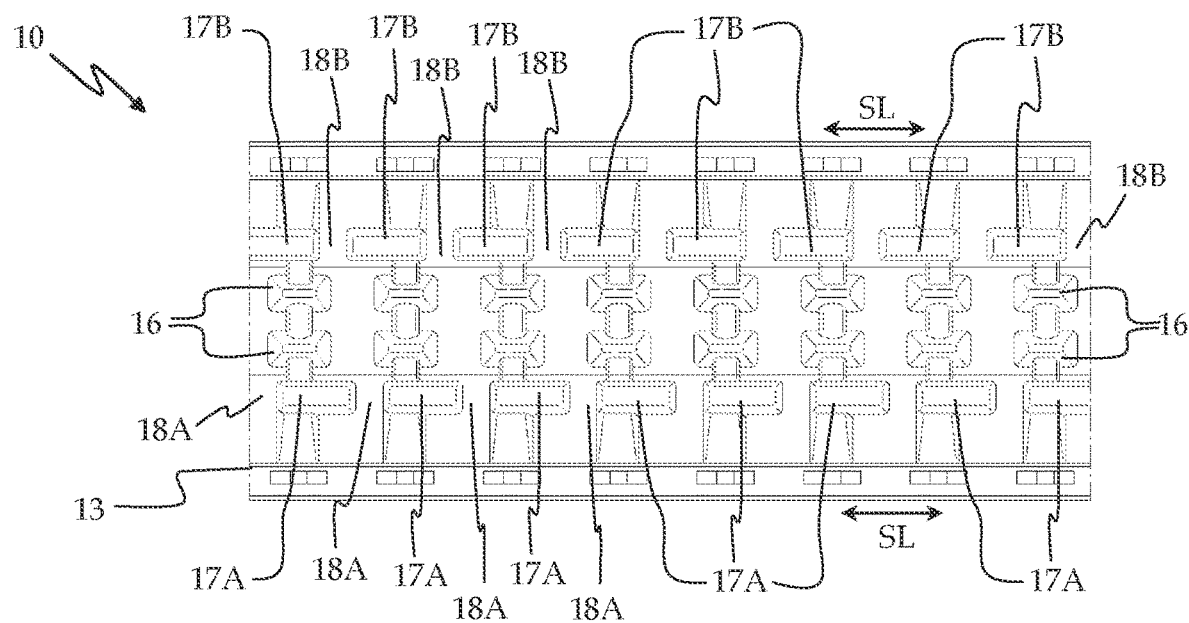

In FIGS. 4A and 4B it can be noticed that the inner surface of the track 10 comprises a plurality of first knobs 17A and a plurality of second knobs 17B projecting vertically from the support element 13, wherein the first knobs 17A are mutually aligned and spaced apart along the longitudinal development SL of the track 10 and the second knobs 17B are mutually aligned and spaced apart along said longitudinal development SL; in this respect, the first knobs 17A and the second knobs 17B form a rigid support surface for the wheels (and/or any rollers) that carry the weight of the vehicle 1.

In accordance with a preferred embodiment, as is particularly visible in FIG. 4B, each first knob 17A is longitudinally offset (with reference to the longitudinal development SL of the track 10) relative to each second knob 17B.

In substance, each second knob 17B is at least partly positioned alongside a respective first space 18A interposed between a pair of aligned and spaced apart first knobs 17A, and each first knob 17A is at least partly positioned alongside a respective second space 18B interposed between a pair of aligned and spaced apart second knobs 17B.

It should be noted that the first knobs 17A and the second knobs 17B are external to the teeth 16, i.e., closer to the outer edges of the support element 13.

The provisions concerning the first knobs 17A and the second knobs 17B permit realizing the track 10 according to the present invention in such a way as to avoid any irregularity in the forward motion of the vehicle 1, particularly by avoiding the generation of constant-frequency vibrations that might adversely affect the whole superstructure of the vehicle 1, resulting in annoying noise and poor driving comfort.

The features of the track 10 and of the associated vehicle 1 according to the present invention, as well as the advantages thereof, are apparent from the above description.

In particular, the peculiar features of the present invention make it possible to realize the track 10, and the associated vehicle 1, in such a way as to correctly distribute the mechanical forces generated when the track is in motion and to ensure a longer life and a higher integrity of the inner shoes 11 and outer shoes 12 associated with the track 10, as well as of the track 10 itself, thus considerably extending the time intervals to be observed for servicing such components.

Furthermore, the track 10 according to the present invention is so realized as to be able to properly operate on different surfaces, and particularly also on very rough terrain (e.g. soft, muddy, sandy, snowy, etc. terrain) and/or steep slopes; in this regard, in fact, it should be noted that it will be sufficient to provide the track 10 with an outer shoe 12 specifically designed for a particular application (asphalt, building yard, forestry, snow removal, and so forth) and/or a particular terrain and/or a given slope where the vehicle 1 of the present invention will have to be used.

The track 10 according to the present invention is then so realized as to avoid any irregularity in the forward motion of the vehicle 1, particularly by avoiding the generation of constant-frequency vibrations that might adversely affect the whole superstructure of the vehicle 1, resulting in annoying noise and poor driving comfort.

The track 10 and the associated vehicle 1 described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to the above-described track 10 and associated vehicle 1, but may be subject to many modifications, improvements or replacements of equivalent parts and elements without departing from the inventive idea, as clearly specified in the following claims.

The invention claimed is:

1. A rubber track for a tracked vehicle, said track being of the type that comprises:
   a plurality of inner shoes and a plurality of outer shoes, wherein each inner shoe lies opposite to a respective outer shoe,
   wherein the inner shoe has a substantially arched shape and is provided with a first intermediate portion and first ends,
   and wherein the outer shoe is provided with a second intermediate portion and second ends,
   said first ends and second ends being substantially parallel to each other and forming a first contact surface between the inner shoe and the outer shoe;
   a support element made of rubber and shaped as an endless ring retained between said inner shoes and said outer shoes, wherein the inner shoes are arranged mutually spaced apart along an inner surface of the support element and the outer shoes are arranged mutually spaced apart along an outer surface of the support element, and wherein the first intermediate portion of each inner shoe is at least partly buried in the support element so that a first portion of each inner shoe is completely encircled by the support element at a location between the first ends;
   a plurality of connection elements for creating the junction between each inner shoe and the respective outer shoe, wherein said connection elements are held inside first seats formed in the first ends of each inner shoe and inside second seats formed in the second ends of each outer shoe,
   wherein the first intermediate portion of the inner shoe and the second intermediate portion of the outer shoe comprise mutual coupling elements forming a second contact surface between the inner shoe and the outer shoe.

2. The track according to claim 1, wherein said coupling elements comprise a male element adapted to be received inside a female element so as to create a coupling system.

3. The track according to claim 2, wherein the male element is formed on the second intermediate portion of the outer shoe and the female element is formed on the first intermediate portion of the inner shoe.

4. The track according to claim 1, wherein the inner shoe is made of metallic material.

5. The track according to claim 1, wherein the outer shoe is made of metallic material.

6. The track according to claim 1, wherein the outer shoe is so realized as to have a metal core at least partly coated with rubber.

7. The track according to claim 1, wherein the outer shoe is substantially totally made of rubber.

8. The track according to claim 1, wherein the outer shoe is so realized as to comprise projections rising from the outer shoe in the direction opposite to the respective inner shoe.

9. The track according to claim 1, wherein an inner surface of the track comprises a plurality of teeth coupled two by two transversally to a longitudinal development of the track, so as to form pairs of teeth spaced apart along the longitudinal development of the track, which define a substantially U-shaped seat.

10. The track according to claim 9, wherein the plurality of teeth are at least partially covered by the support element.

11. The track according to claim 1, wherein an inner surface of the track comprises a plurality of first knobs and a plurality of second knobs projecting vertically from the support element, wherein the first knobs are mutually aligned and spaced apart along a longitudinal development of the track and the second knobs are mutually aligned and spaced apart along said longitudinal development.

12. The track according to claim 11, wherein each first knob is longitudinally offset relative to each second knob.

13. The track according to claim 1, wherein said support element comprises, buried therein, at least one metallic element shaped as an endless ring that extends along a longitudinal development of the track.

14. The track according to claim 13, wherein said metallic element is made from steel strands wound into multiple seamless coils.

15. The track according to claim 1, wherein said connection elements consist of square underhead bolts.

16. The track according to claim 15, wherein said bolts are inserted from an inner surface of the track towards an outer surface of said track, a head of said bolts being retained in the first seats of the inner shoe, which is shaped to receive said head without allowing it to turn.

17. A tracked vehicle comprising the track according to claim 1.

18. The track according to claim 1, further comprising a second portion of each inner shoe being completely encircled by the support element at a second location between the first ends, the first portion and the second portion being separated by and located on opposing sides of the second contact surface.

* * * * *